United States Patent
Deljosevic et al.

(10) Patent No.: US 12,194,996 B2
(45) Date of Patent: Jan. 14, 2025

(54) DYNAMICALLY ADJUSTING ADAPTIVE CRUISE CONTROL

(71) Applicant: Continental Autonomous Mobility US, LLC, Auburn Hills, MI (US)

(72) Inventors: Marjan Deljosevic, Shelby Township, MI (US); Ermal Gjoni, Sterling Heights, MI (US); Gentian Godo, Troy, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 386 days.

(21) Appl. No.: 17/652,930

(22) Filed: Mar. 1, 2022

(65) Prior Publication Data

US 2023/0278558 A1    Sep. 7, 2023

(51) Int. Cl.
*B60W 30/16* (2020.01)
*B60W 50/00* (2006.01)

(52) U.S. Cl.
CPC ........ *B60W 30/16* (2013.01); *B60W 50/0098* (2013.01); B60W 2050/0026 (2013.01); B60W 2050/0028 (2013.01); B60W 2510/18 (2013.01); B60W 2530/10 (2013.01); B60W 2530/20 (2013.01); B60W 2552/15 (2020.02); B60W 2554/4042 (2020.02);
(Continued)

(58) Field of Classification Search
CPC ............. B60W 30/16; B60W 50/0098; B60W 2050/0026; B60W 2050/0028; B60W 2510/18; B60W 2530/10; B60W 2530/20; B60W 2552/15; B60W 2554/4042; B60W 2554/802; B60W 2556/50; B60W 2720/10; B60W 2050/0083; B60W 2552/35
See application file for complete search history.

(56) References Cited

U.S. PATENT DOCUMENTS 6,882,923 B2 * 4/2005 Miller ................ B60K 31/0058
340/436
2015/0175163 A1    6/2015 Pilkington
(Continued)

FOREIGN PATENT DOCUMENTS

CN    1215948 A    5/1999
CN    1569524 A *  1/2005
(Continued)

OTHER PUBLICATIONS

Fan Zilin, Sep. 13, 2006, English Machine Translation_ CN1569524A provided by Patent Translate by EPO and Google (Year: 2005).*

(Continued)

*Primary Examiner* — Ashley L Redhead, Jr.
(74) *Attorney, Agent, or Firm* — William Esser; Matthew Binkowski

(57) ABSTRACT

A dynamic adaptive cruise control method for a first vehicle includes a controller disposed within the first vehicle identifying a second vehicle in a direction of travel of the first vehicle. The controller determines a distance between the first vehicle and the second vehicle. The controller determines a safe travel distance between the first vehicle and the second vehicle based at least in part on a set of primary factors and a set of secondary factors. The controller modifies a cruise speed of the first vehicle to maintain at least the determined safe travel distance between the first vehicle and the second vehicle.

20 Claims, 2 Drawing Sheets

(52) U.S. Cl.
CPC ... *B60W 2554/802* (2020.02); *B60W 2556/50* (2020.02); *B60W 2720/10* (2013.01)

(56) References Cited

U.S. PATENT DOCUMENTS

| | | | |
|---|---|---|---|
| 2019/0126892 A1 | 5/2019 | Lee | |
| 2019/0367032 A1* | 12/2019 | Ito | B60W 50/00 |
| 2020/0148213 A1* | 5/2020 | Gawande | B60W 50/0098 |
| 2020/0324766 A1* | 10/2020 | Zhao | B60W 30/16 |
| 2021/0213948 A1* | 7/2021 | Lahti | B60W 30/162 |
| 2021/0302977 A1* | 9/2021 | Saikyo | B60W 50/14 |
| 2023/0150460 A1* | 5/2023 | Oshita | B60T 7/22 |
| | | | 701/96 |
| 2023/0294694 A1* | 9/2023 | Oshita | G08G 1/16 |
| | | | 701/96 |
| 2024/0025408 A1* | 1/2024 | Fukasawa | B60W 40/105 |

FOREIGN PATENT DOCUMENTS

| | | | | |
|---|---|---|---|---|
| DE | 102012012829 A1 | | 1/2013 | |
| JP | 2019519039 A | | 7/2019 | |
| KR | 20050026127 A | | 3/2005 | |
| KR | 101531826 B1 | | 6/2015 | |
| KR | 20190109636 A | | 9/2019 | |
| WO | WO-2018039114 A1 | * | 3/2018 | ......... B60R 16/0231 |

OTHER PUBLICATIONS

Switkes Joshua P, Aug. 22, 2016, English Machine Translation_WO2018039114A1 provided by Patent Translate by EPO and Google (Year: 2016).*

The International Search Report and the Written Opinion of the International Searching Authority mailed on Jun. 30, 2023 for the counterpart PCT Application No. PCT/US2023/063414.

* cited by examiner

DYNAMICALLY ADJUSTING ADAPTIVE CRUISE CONTROL

TECHNICAL FIELD

The present disclosure relates generally to cruise control systems for vehicles, and more specifically to a dynamically adjusting adaptive cruise control.

BACKGROUND

Vehicle cruise controls maintain a desired speed of the vehicle without requiring a constant input from vehicle operator. Conventional cruise controls maintain a steady speed until the vehicle operator deactivates the cruise control by braking, or via some other similar input. Once deactivated the operator must reactivate the cruise control manually.

In newer systems, the vehicles include forward facing sensors and cameras that are capable of detecting a second vehicle ahead of the operator and in the same lane as the operator. Once such a detection is made, an adaptive cruise control can be configured to automatically reduce a speed to maintain a predefined distance between the vehicle and the second vehicle. In some cases, the predefined distance is hard coded and cannot be changed. In other cases, the vehicle operator can manually set the predefined distance.

Existing adaptable cruise control systems can account for the speed of the vehicle ahead of the first vehicle by continuously polling the sensors and cameras to determine the distance between the vehicles. The distance is compared to a worst case scenario safe distance and the cruise control speed is reduced when the sensed distance is approaching the worst case scenario safe distance.

Existing adaptable cruise control systems are unable to account for secondary factors that may impact the actual safe distance required, resulting in their reliance on the worst case scenario safe distance.

SUMMARY OF THE INVENTION

In one exemplary embodiment a dynamic adaptive cruise control method for a first vehicle includes a controller disposed within the first vehicle identifying a second vehicle in a direction of travel of the first vehicle, the controller determining a distance between the first vehicle and the second vehicle, the controller determining a safe travel distance between the first vehicle and the second vehicle, wherein the safe travel distance is determined based at least in part on a set of primary factors and a set of secondary factors, and modifying a cruise speed of the first vehicle to maintain at least the determined safe travel distance between the first vehicle and the second vehicle.

In another example of the above described dynamic adaptive cruise control method the set of primary factors includes at least one of a preset minimum distance, a speed of the first vehicle and a speed of the second vehicle.

In another example of any of the above described dynamic adaptive cruise control methods the set of primary factors includes each of the preset minimum distance, the speed of the first vehicle, and the speed of the second vehicle.

In another example of any of the above described dynamic adaptive cruise control methods the set of secondary factors includes at least one of brake fade of the first vehicle, wet brake status of the first vehicle, load of the first vehicle, tire condition of the first vehicle, road conditions, and road grade.

In another example of any of the above described dynamic adaptive cruise control methods the set of secondary factors includes at least [three] of brake fade of the first vehicle, wet brake status of the first vehicle, load of the first vehicle, tire condition of the first vehicle, road conditions, and road grade.

Another example of any of the above described dynamic adaptive cruise control methods further includes receiving at least one of the brake fade, wet brake status and vehicle load from an electronic brake controller.

Another example of any of the above described dynamic adaptive cruise control methods further includes receiving at least one of the tire conditions of the first vehicle, road conditions and road grade from one of a corresponding microcontroller, a GPS system, and a sensor.

In another example of any of the above described dynamic adaptive cruise control methods determining a safe travel distance between the first vehicle and the second vehicle comprises determining a nominal safe distance based on the set of primary factors, determining at least one modifier based on the set of secondary factors, and applying the at least one modifier to the nominal safe distance.

In another example of any of the above described dynamic adaptive cruise control methods applying the at least one modifier to the nominal safe distance includes multiplying the nominal safe distance by the modifier.

In another example of any of the above described dynamic adaptive cruise control methods applying the at least one modifier to the nominal safe distance includes adding the modifier to the nominal safe distance.

In another example of any of the above described dynamic adaptive cruise control methods determining the at least one modifier comprises identifying a value of one of the secondary factors in the set of secondary factors and checking a look up table correlating the value to a modifier corresponding to the one of the secondary factor.

In another example of any of the above described dynamic adaptive cruise control methods determining the at least one modifier comprises identifying a value of one of the secondary factors in set of secondary factors and applying the value to a laboratory determined formula where an output of the formula is the modifier corresponding to the one of the secondary factors.

In another example of any of the above described dynamic adaptive cruise control methods determining at least on modifier based on the set of secondary factors comprises determining a plurality of modifiers.

In another example of any of the above described dynamic adaptive cruise control methods a first subset of the modifiers are additive modifiers and a second subset of the modifiers are multiplicative modifiers.

The method of claim 14, wherein the at least one modifier is applied using mathematical order of operations.

In another example of any of the above described dynamic adaptive cruise control methods at least one modifier in the first subset of modifiers is applied prior to at least one modifier in the second subset of modifiers.

In another example of any of the above described dynamic adaptive cruise control methods the process is continuously iterated and the minimum safe distance is continuously updated for a full duration of cruise control operations.

In another example of any of the above described dynamic adaptive cruise control methods the process is initiated on initiation of cruise control operations.

In one exemplary embodiment a controller including a processor and a memory, the memory storing instructions configured to cause the controller to identify a second vehicle in a direction of travel of a first vehicle containing the controller and determine a distance between the first vehicle and the second vehicle based on sensor signals received from the first vehicle, continuously determine a safe travel distance between the first vehicle and the second vehicle based at least in part on a set of primary factors and a set of secondary factors, and modifying a cruise speed of the first vehicle to maintain at least the determined safe travel distance between the first vehicle and the second vehicle In another example of the above described controller determining a safe travel distance between the first vehicle and the second vehicle comprises determining a nominal safe distance based on the set of primary factors, determining at least one modifier based on the set of secondary factors, and applying the at least one modifier to the nominal safe distance.

These and other features of the present invention can be best understood from the following specification and drawings, the following of which is a brief description.

DETAILED DESCRIPTION

Figure 1:
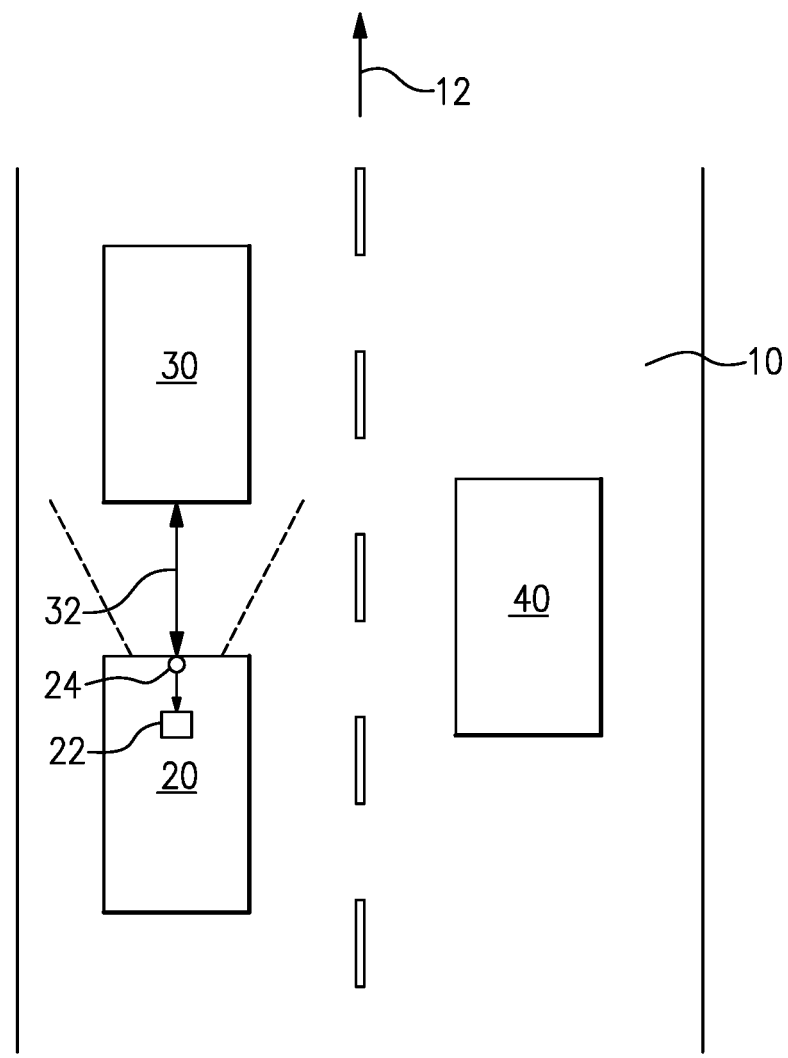
FIG. 1 schematically illustrates an exemplary dynamic active cruise control operation.

FIG. 1 schematically illustrates multiple vehicles 20, 30, 40 on a road 10. The vehicles 20, 30, 40 are traveling in a forward direction 12. A first vehicle 20, referred to herein as the primary vehicle, includes a controller 22 configured to operate a dynamically adjusting adaptive cruise control system. The dynamically adjusting adaptive cruise control system monitors a distance 32 between the primary vehicle 20 and the vehicle 30 forward of the primary vehicle 20. Conventional adaptive cruise control systems monitor the distance, and reduce the speed of the cruise control of the primary vehicle 20 in order to maintain a predefined minimum distance. However, the conventional system are unable to adjust the safe distance to account for road conditions and vehicle states and instead rely on a static worst case scenario safe distance. Unlike conventional adaptive cruise control systems, the dynamically adjusting adaptive cruise control system included in the controller 20 monitors external factors and adjusts the minimum safe distance to account for the external factors.

Once the distance 32 is established, the dynamically adjustable cruise control calculates the minimum safe distance and maintains the distance 32 between the first vehicle 20 and a second vehicle 30 at or above the minimum safe distance. In order to determine the distance 32 for both initial determinations and for monitoring purposes, a forward facing sensor 24, or set of sensors includes a field of view 26 capable of detecting vehicles 30 immediately in front of the first vehicle 20, while not detecting adjacent vehicles 40 to the side of the primary vehicle 20. By way of example, the sensors can include image sensors, LIDAR sensors, RADAR sensors, or any similar distance and/or proximity detection sensors. Further, in some example the forward facing sensor 24 can include a combination of different types of sensors having different fields of views. In addition, some of the sensors are capable of detecting other vehicles and objects directly and other of the sensors provide sensor data that a vehicle controller can use to derive the presence of other vehicles and objects.

In alternative examples, the sensor 24 or sensor network can include sensors detecting adjacent vehicles 40, and the controller 20 is capable of differentiating between the adjacent vehicles 40 that will not impact the distance 32 between the primary vehicle 20 and vehicles 30 in front of the primary vehicle 20 that will impact the distance 32. In order to maintain the minimum safe distance, the dynamically adjusting adaptive cruise control adjusts the speed of the primary vehicle 20 by reducing the cruise speed of the primary vehicle 20 as the primary vehicle 20 approaches the minimum safe distance between itself and the vehicle 30 in front of it.

In some cases the controller 22 is a general vehicle controller connected to multiple distinct vehicle sensors and systems. In alternative examples, the controller 20 is an electronic brake controller and is connected to a general vehicle controller and/or a vehicle sensor network via a bus, such as a CAN bus. In either case, the controller 22 has access to data indicative of multiple primary factors including primary vehicle speed, acceleration, and the like and multiple secondary factors including a brake fade of the primary vehicle, wet brake status of the primary vehicle, load of the primary vehicle, tire condition of the primary vehicle, road conditions, and road grade. It is appreciated that the foregoing list is exemplary in nature and is not exclusive of all dynamically adjusting cruise control systems. Further, some embodiments can utilize less than all of the secondary factors in any combination.

When the cruise control is initially activated, the vehicle determines a nominal minimum safe distance. The nominal minimum safe distance can be either a predefined distance or be dependent on the known primary factors. In either case, the nominal minimum safe distance is determined using conventional adaptive cruise control processes.

The dynamically adjusting adaptive cruise control continuously monitors the available secondary factors and adjusts the nominal minimum safe distance to account for the available secondary factors. The controller accounts for each available secondary factor by converting the measured secondary factor into a multiplier, with a positive multiplier increasing the minimum safe distance and a negative multiplier decreasing the minimum safe distance. A predefined "nominal" safe distance is then multiplied by each of the determined multipliers to obtain the final minimum safe distance. For each factor, the multiplier can be determined via laboratory testing and is dependent on the specific vehicle characteristics. By way of example, a heavier vehicle may have a smaller multiplier than a lighter vehicle in rain conditions due to a lower likelihood of hydroplaning.

In one example, the secondary factor can include "towing another vehicle" and apply a multiplier that increases the safe distance (e.g. a multiplier of 1.2). In another example, if the brakes are heated, or the road is icy, the safe distance is increased by a multiplier greater than 1. The particular values for any given multiplier are dependent on the specifics of the vehicle incorporating the adaptive cruise control, and can be determined via conventional lab testing.

In alternative examples, one or more of the secondary factors can provide additive adjustments to the minimum safe distance rather than multiplicative adjustments. In such an example the adjustments are typically applied using the mathematical order of operations. In alternative arrangements a specific modifier can be defined as being applied at a specific order position (e.g. road condition modifiers may be applied at the end regardless of whether the modifier is additive or multiplicative.)

Figure 2:
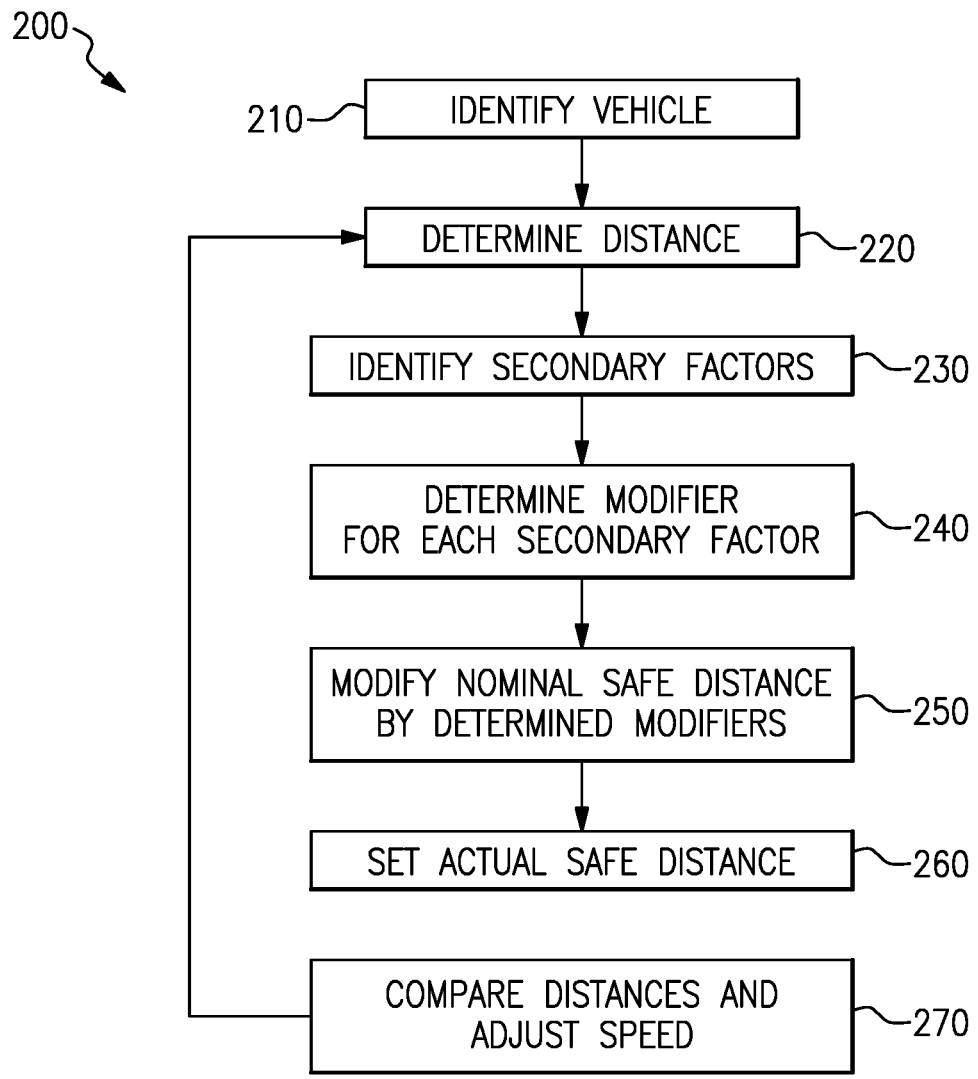
FIG. 2 illustrates an exemplary method for operating the dynamic active cruise control.

With continued reference to FIG. 1, FIG. 2 illustrates a method 20 for operating a dynamically adjusting adaptive cruise control. Initially, a vehicle 30 is identified ahead of the primary vehicle 40 using the sensors 24 in an "Identify Vehicle" step 210. Once the second vehicle has been identified, the controller performing the dynamically adjusting cruise control process determines a current distance to the secondary vehicle 30 in a "Determine Distance" step 220. The determined distance is compared to a current minimum safe distance (in the first iteration, this is set as the nominal safe distance), and any necessary corrections are applied. Necessary corrections can include braking, decelerating, providing alerts, etc.

After determining the distance, and providing the comparison, the controller identifies any available secondary factors in an "Identify Secondary Factors" step 230. The secondary factors can include a brake fade of the primary vehicle 20, a wet/dry brake status of the primary vehicle 20, a load (i.e., weight) on the primary vehicle 20, a tire condition of the primary vehicle, current road conditions, a current road grade, and any similar related systems. Certain of the secondary factors can be identified by other vehicle sensor systems and provided to the cruise control system controller. Other of the secondary factors can be identified using a combination of systems such as a GPS system, onboard microcontrollers and the like.

In addition to the secondary factors, the controller determines the primary factors including a present minimum distance, a speed of the vehicle, and a speed of the second vehicle in front of the vehicle. The controller uses the speed(s) of the vehicles and the present minimum distance to determine the nominal safe distance. Each iteration of the method 200 redetermines the nominal safe distance in addition to recalculating the modifiers based on the secondary factors.

For each available secondary factor a corresponding minimum safe distance modifier is calculated in a "Determine Modifier for Each Secondary Factor" step 240. In one example, the distance modifier is identified using a predetermined lookup table where each factor has its own weight/multiplier. The lookup table is vehicle specific, as each vehicle has different weight/criteria.

In some examples, the multipliers are determined via checking a lookup table stored in the controller, with the look up table associating a factor with a corresponding multiplier. In another example, one or more of the factors can be used to determine a modifier by inputting the value of the factor into a laboratory determined equation, with the output of the equation being the multiplier.

Once the modifier has been determined, the modifiers are applied to the nominal safe distance in a "Modify Nominal Safe Distance by Determined Modifiers" step 250. As described above, in some examples the modifiers are applied in mathematical order of operations with multipliers applied first, follow by additive modifiers. In other examples, a specific order of operations may be predefined within the cruise control controller, and the modifiers are applied in the defined order. The result of the application of the modifiers is a new actual safe distance, and the actual safe distance is stored in the controller in a "Set Actual Safe Distance" step 260.

Once the actual safe distance has been set and stored, the controller compares the sensed distance to the actual safe distance in a compare distances step 270. When the determined distance is approaching or at the actual safe distance, the controller responds by performing the appropriate actions as described above at step 220 and the process reiterates.

Further, the dynamic adjustment process described above, and illustrated in FIG. 2, continuously determines the actual safe distance and updates whenever a change is necessary. As such, no triggering event is necessary or used to initiate the dynamic adjustment.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A dynamic adaptive cruise control method for a first vehicle comprising:
a controller disposed within the first vehicle identifying a second vehicle in a direction of travel of the first vehicle;
the controller determining a distance between the first vehicle and the second vehicle;
the controller determining a safe travel distance between the first vehicle and the second vehicle, wherein the safe travel distance is determined based at least in part on a set of primary factors and a set of secondary factors;
modifying a cruise speed of the first vehicle to maintain at least the determined safe travel distance between the first vehicle and the second vehicle;
wherein determining a safe travel distance between the first vehicle and the second vehicle comprises determining a nominal safe distance based on the set of primary factors, determining at least one modifier based on the set of secondary factors and applying the at least one modifier to the nominal safe distance
wherein determining at least on modifier based on the set of secondary factors comprises determining a plurality of modifiers; and
wherein a first subset of the modifiers are additive modifiers and a second subset of the modifiers are multiplicative modifiers.

2. The method of claim 1, wherein the set of primary factors includes at least one of a preset minimum distance, a speed of the first vehicle and a speed of the second vehicle.

3. The method of claim 2, wherein the set of primary factors includes each of the preset minimum distance, the speed of the first vehicle, and the speed of the second vehicle.

4. The method of claim 1, wherein the set of secondary factors includes at least one of brake fade of the first vehicle, wet brake status of the first vehicle, load of the first vehicle, tire condition of the first vehicle, road conditions, and road grade.

5. The method of claim 4, wherein the set of secondary factors includes at least [three] of brake fade of the first vehicle, wet brake status of the first vehicle, load of the first vehicle, tire condition of the first vehicle, road conditions, and road grade.

6. The method of claim 4, further comprising receiving at least one of the brake fade, wet brake status and vehicle load from an electronic brake controller.

7. The method of claim 4, further comprising receiving at least one of the tire conditions of the first vehicle, road conditions and road grade from one of a corresponding microcontroller, a GPS system, and a sensor.

8. The method of claim 1, wherein applying the at least one modifier to the nominal safe distance includes multiplying the nominal safe distance by the modifier.

9. The method of claim 1, wherein applying the at least one modifier to the nominal safe distance includes adding the modifier to the nominal safe distance.

10. The method of claim 1, wherein determining the at least one modifier comprises identifying a value of one of the secondary factors in the set of secondary factors and checking a look up table correlating the value to a modifier corresponding to the one of the secondary factor.

11. The method of claim 1, wherein determining the at least one modifier comprises identifying a value of one of the secondary factors in set of secondary factors and applying the value to a laboratory determined formula where an output of the formula is the modifier corresponding to the one of the secondary factors.

12. The method of claim 1, wherein the at least one modifier is applied using mathematical order of operations.

13. The method of claim 1, wherein at least one modifier in the first subset of modifiers is applied prior to at least one modifier in the second subset of modifiers.

14. The method of claim 1, wherein the process is continuously iterated and the minimum safe distance is continuously updated for a full duration of cruise control operations.

15. The method of claim 14, wherein the process is initiated on initiation of cruise control operations.

16. A controller comprising:
a processor and a memory, the memory storing instructions configured to cause the controller to identify a second vehicle in a direction of travel of a first vehicle containing the controller and determine a distance between the first vehicle and the second vehicle based on sensor signals received from the first vehicle, continuously determine a safe travel distance between the first vehicle and the second vehicle based at least in part on a set of primary factors and a set of secondary factors, and modifying a cruise speed of the first vehicle to maintain at least the determined safe travel distance between the first vehicle and the second vehicle;

wherein determining a safe travel distance between the first vehicle and the second vehicle comprises determining a nominal safe distance based on the set of primary factors, determining at least one modifier based on the set of secondary factors and applying the at least one modifier to the nominal safe distance;

wherein determining at least on modifier based on the set of secondary factors comprises determining a plurality of modifiers; and wherein a first subset of the modifiers are additive modifiers and a second subset of the modifiers are multiplicative modifiers.

17. The controller of claim 16, wherein the at least one modifier is applied using mathematical order of operations.

18. The controller of claim 16, wherein at least one modifier in the first subset of modifiers is applied prior to at least one modifier in the second subset of modifiers.

19. The controller of claim 16, wherein the process is continuously iterated and the minimum safe distance is continuously updated for a full duration of cruise control operations.

20. The controller of claim 16, wherein the set of primary factors includes at least one of a preset minimum distance, a speed of the first vehicle and a speed of the second vehicle and wherein the set of secondary factors includes at least one of brake fade of the first vehicle, wet brake status of the first vehicle, load of the first vehicle, tire condition of the first vehicle, road conditions, and road grade.

* * * * *